(12) United States Patent
No

(10) Patent No.: US 10,072,764 B2
(45) Date of Patent: Sep. 11, 2018

(54) COUPLING STRUCTURE OF ELECTROMAGNETIC VALVE FOR CONTROLLING WATER SUPPLY

(71) Applicant: USEONG ELECTRO-MECHANICS CO., LTD., Anyang-si (KR)

(72) Inventor: Gwan Ho No, Seoul (KR)

(73) Assignee: USEONG ELECTRO-MECHANICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 15/300,890

(22) PCT Filed: Mar. 27, 2015

(86) PCT No.: PCT/KR2015/003026
§ 371 (c)(1),
(2) Date: Sep. 30, 2016

(87) PCT Pub. No.: WO2015/182863
PCT Pub. Date: Dec. 3, 2015

(65) Prior Publication Data
US 2017/0067567 A1    Mar. 9, 2017

(30) Foreign Application Priority Data
May 28, 2014    (KR) .......................... 10-2014-0064455

(51) Int. Cl.
*F16K 7/12* (2006.01)
*F16K 27/02* (2006.01)
(Continued)

(52) U.S. Cl.
CPC ................ *F16K 7/12* (2013.01); *F16K 27/06* (2013.01); *F16K 31/06* (2013.01); *H01H 9/22* (2013.01)

(58) Field of Classification Search
CPC ........ F16K 7/12; F16K 27/02; F16K 27/0236; F16K 27/029; F16K 31/0655;
(Continued)

(56) References Cited

U.S. PATENT DOCUMENTS 4,679,767 A * 7/1987 Vollmer ................ H01F 7/1607
251/129.15
8,944,100 B2 * 2/2015 Pifer ................... F02M 25/0836
123/516

(Continued)

FOREIGN PATENT DOCUMENTS

JP         09042508       2/1997
KR     2019980066245    12/1998
(Continued)

OTHER PUBLICATIONS

International Search Report—PCT/KR2015/003026 dated Jul. 2, 2015.

*Primary Examiner* — Seth W Mackay-Smith
(74) *Attorney, Agent, or Firm* — Cantor Colburn LLP

(57) ABSTRACT

Provided is a coupling structure of an electromagnetic valve for controlling water supply. The coupling structure comprises: a coupling member provided with a coupling protrusion to be coupled to an upper portion of the valve body; at least one hook provided on the coupling member to be hooked to a locking piece; a supporting plate outwardly extending from a lower end of a sleeve to support the electromagnetic part, the sleeve being divided into upper and lower parts provided at upper and lower portions of the electromagnetic part; the locking piece provided at an end of the supporting plate by being bent upwardly to be hooked to the hook; and engaging pieces protruding from opposite sides of the supporting plate to engage with engaging grooves of the sleeve, thereby preventing the electromagnetic part from rotating.

18 Claims, 5 Drawing Sheets

(51) Int. Cl.
*F16K 31/06* (2006.01)
*H01H 9/22* (2006.01)
*F16K 27/06* (2006.01)

(58) Field of Classification Search
CPC ..... F16K 31/065; B08B 9/055; B08B 9/0551; F16B 41/00; F16L 55/38; F16L 55/46; H01H 50/04; H01H 50/041; H01H 50/042; H01H 9/02; H01H 9/0271; H01H 9/22; H01H 9/223; H01H 9/24
USPC ............................................ 251/128, 129.15
See application file for complete search history.

(56) References Cited

U.S. PATENT DOCUMENTS

| | | | |
|---|---|---|---|
| 2010/0269921 A1* | 10/2010 | Pifer ................ | B60K 15/03519 137/487.5 |
| 2014/0246615 A1* | 9/2014 | Volz ...................... | F16K 27/029 251/129.15 |
| 2015/0323091 A1* | 11/2015 | McCraven .......... | G05D 7/0688 137/15.18 |
| 2016/0123490 A1* | 5/2016 | McLauchlan ....... | F16K 31/0675 137/15.18 |

FOREIGN PATENT DOCUMENTS

| | | |
|---|---|---|
| KR | 200340136 | 1/2004 |
| KR | 1020130066539 | 6/2013 |
| KR | 101270515 | 7/2013 |

\* cited by examiner

COUPLING STRUCTURE OF ELECTROMAGNETIC VALVE FOR CONTROLLING WATER SUPPLY

TECHNICAL FIELD

The present invention relates generally to a coupling structure of an electromagnetic valve for controlling water supply. More particularly, the present invention relates to a coupling structure of an electromagnetic valve for controlling water supply, the coupling structure being capable of simply assembling the electromagnetic valve by easily coupling an electromagnetic part to a valve body with a hook, thereby enhancing productivity, and allowing reliable operation of the electromagnetic valve without malfunction of the electromagnetic part by preventing the electromagnetic part from rotating on a coupling member.

BACKGROUND ART

Generally, an electromagnetic valve using an electromagnet to control water supply is used in products such as washing machines, refrigerators, beverage vending machines, dishwashers, boilers, etc. that use automatic water supply devices.

The electromagnetic valve is provided at an end portion of a water supply system such as a water pipeline system, etc. or is provided at an inlet side of a target product so as to control water supply.

The present applicant has proposed 'an electromagnetic valve' disclosed in Korean Patent No. 10-1270515.

The electromagnetic valve includes a body having a channel through which water is introduced and discharged, and an electromagnetic part provided on the channel of the body to control water supply in the body.

However, the electromagnetic valve has been manufactured by a method of fixing the electromagnetic part to the body by applying a high-frequency thermal fusion to a junction of the electromagnetic part and the body. The method demands a high level of technology such that time for assembly work increases, and thus productivity decreases. In addition, when the electromagnetic part malfunctions, or is required to be replaced, it is difficult to separate the electromagnetic part from the body. Thus, the entire electromagnetic valve should be replaced thus increasing maintenance costs, which is uneconomic.

DISCLOSURE

Technical Problem

The present invention has been proposed to solve the problems in the related art. The present invention is intended to propose a coupling structure of an electromagnetic valve for controlling water supply, the coupling structure being capable of simply assembling the electromagnetic valve by easily coupling an electromagnetic part to a valve body with a hook, thereby enhancing productivity.

In addition, the present invention is intended to propose the coupling structure of the electromagnetic valve for controlling water supply, the coupling structure coupling a sleeve of the electromagnetic part to engaging pieces of a supporting plate so as to prevent the electromagnetic part from rotating, thereby allowing reliable operation of the electromagnetic valve without malfunction of the electromagnetic part.

Technical Solution

In order to achieve the above object, according to one aspect of the present invention, there is provided a coupling structure of an electromagnetic valve for controlling water supply, the electromagnetic valve including: a valve body provided with an inlet port and an outlet port through which water is respectively introduced and discharged, and a diaphragm between the inlet port and the outlet port to define a pressure chamber; and an electromagnetic part fixed on the valve body to seal the pressure chamber, wherein the water is introduced into the pressure chamber or discharged to a target device in response to operation of the electromagnetic part, thereby controlling water supply, the coupling structure including:

a coupling member provided with a coupling protrusion to be coupled to an upper portion of the valve body;

at least one hook provided on the coupling member to be hooked to a locking piece;

a supporting plate outwardly extending from a lower end of a sleeve to support the electromagnetic part, the sleeve being divided into upper and lower parts provided at upper and lower portions of the electromagnetic part;

the locking piece provided at an end of the supporting plate by being bent upwardly to be hooked to the hook; and engaging pieces protruding from opposite sides of the supporting plate to engage with engaging grooves of the sleeve, thereby preventing the electromagnetic part from rotating.

Advantageous Effects

The coupling structure of the electromagnetic valve for controlling water supply can enable simple assembly of the electromagnetic valve by coupling the coupling member to the valve body, and coupling the electromagnetic part to the valve body thereafter with the locking piece hooked to the hook, thereby enhancing productivity.

In addition, the coupling structure of the electromagnetic valve for controlling water supply can prevent the electromagnetic part from rotating by coupling a sleeve of the electromagnetic part to engaging pieces of a supporting plate, thereby allowing reliable operation of the electromagnetic valve without malfunction of the electromagnetic part.

Figure 1:
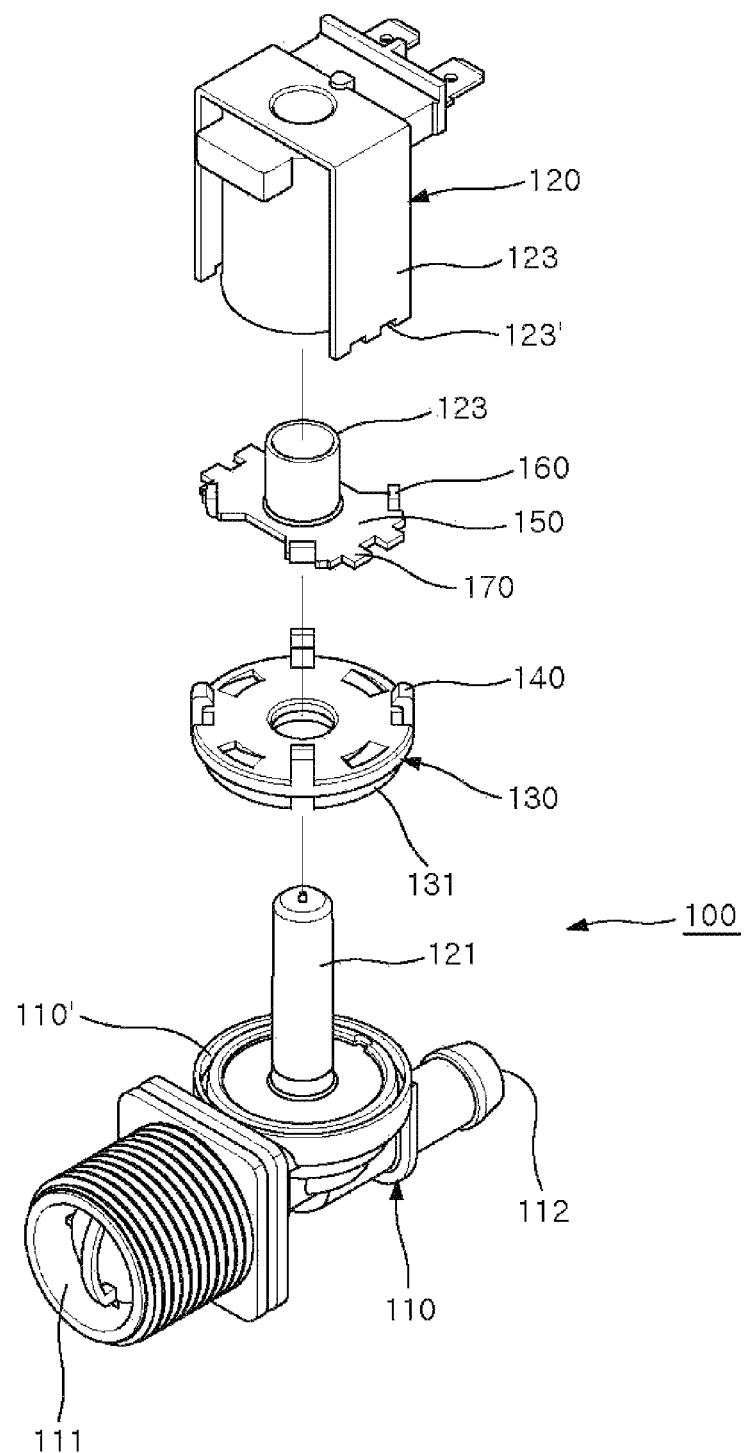
FIG. 1 is an exploded perspective view of the present invention.

Description of main reference numerals of drawings

| | |
|---|---|
| 100: electromagnetic valve | 110: valve body |
| 120: electromagnetic part | 130: coupling member |
| 131: coupling protrusion | 140: hook |
| 150: supporting plate | 160: locking piece |
| 170: engaging piece | |

MODE FOR INVENTION

Hereinafter, an exemplary embodiment of the present invention will be described in detail with reference to the accompanying drawings.

Figure 2:
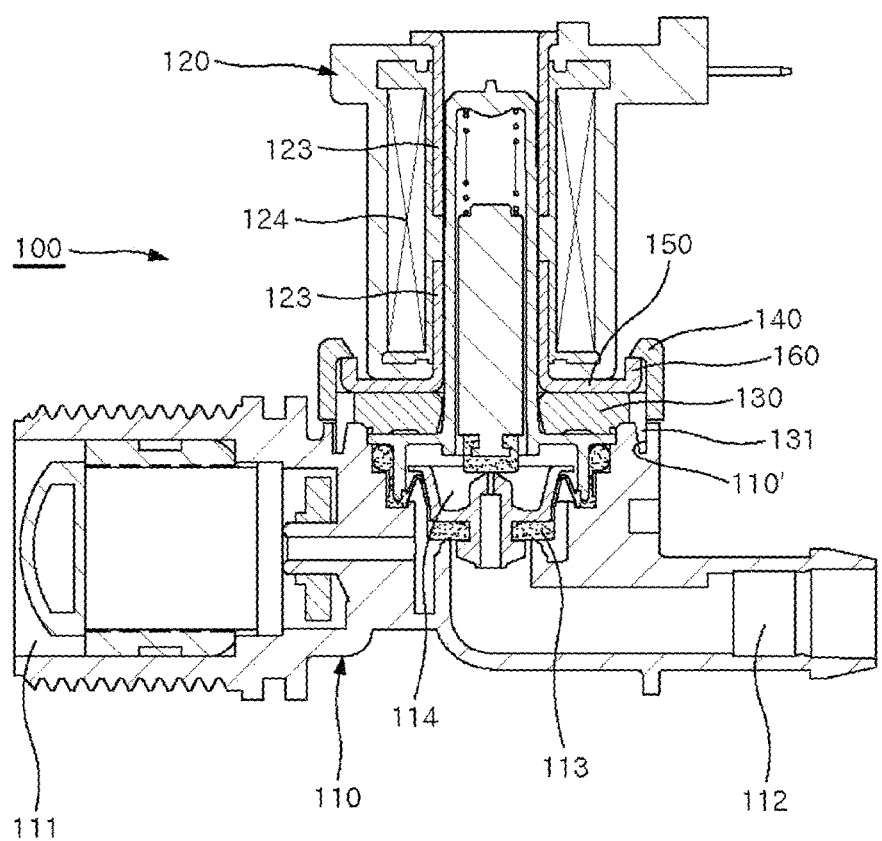
FIG. 2 is a cross-sectional view of the present invention.

FIG. 1 is an exploded perspective view of the present invention. FIG. 2 is a cross-sectional view of the present invention.

According to the exemplary embodiment of the present invention, a coupling structure of an electromagnetic valve for controlling water supply, the electromagnetic valve including:

a valve body 110 provided with an inlet port 111 and an outlet port 112 through which water is respectively introduced and discharged, and a diaphragm 113 between the inlet port 111 and the outlet port 112 to define a pressure chamber 114; and an electromagnetic part 120 fixed on the valve body 110 to seal the pressure chamber 114, wherein the water is introduced into the pressure chamber 114 or discharged to a target device in response to operation of the electromagnetic part 120, thereby controlling water supply, the coupling structure includes: a coupling member 130 provided with a coupling protrusion 131 to be coupled to an upper portion of the valve body 110; at least one hook 140 provided on the coupling member 130 to be hooked to a locking piece 160; a supporting plate 150 outwardly extending from a lower end of a sleeve 123 to support the electromagnetic part 120, the sleeve being divided into upper and lower parts provided at upper and lower portions of the electromagnetic part 120; the locking piece 160 provided at an end of the supporting plate 150 by being bent upwardly to be hooked to the hook 140; and engaging pieces 170 protruding from opposite sides of the supporting plate 150 to engage with engaging grooves 123' of the sleeve 123, thereby preventing the electromagnetic part 120 from rotating. This will be described in more detail below.

The coupling member 130 prevents a cap 121 mounted on the valve body 110 from being removed therefrom.

The hook 140 is provided at an upper portion of the coupling member 130 in a radial direction.

Hereinafter, the process of coupling the above-described components of the present invention will be described in detail.

The present invention relates generally to a coupling structure of an electromagnetic valve for controlling water supply that is used in the target device such as a refrigerator, a water purifier, coffee vending machines, etc.

The electromagnetic valve 100 for controlling water supply includes the valve body 110 provided with the inlet port 111 and the outlet port 112 through which water is respectively introduced and discharged. The diaphragm 113 is provided in the valve body 110 to define the pressure chamber 114. The electromagnetic part 120 is fixed on the valve body 110 to seal the pressure chamber 114. The water is introduced into the pressure chamber 114 or discharged to the target device in response to operation of the electromagnetic part 120, thereby controlling water supply.

The configuration of the electromagnetic valve 100 for controlling water supply is the same as that of a general electromagnetic valve, and thus, a detailed description of the configuration will be omitted.

Figure 3:
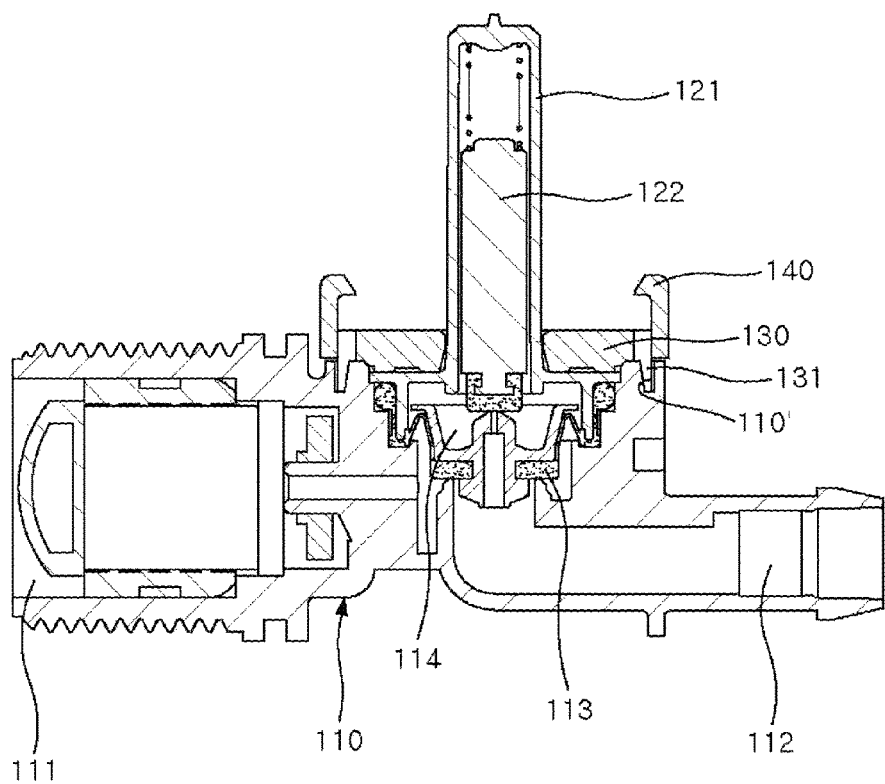
FIGS. 3 to 5 are cross-sectional views showing a state of coupling an electromagnetic part to a valve body of the present invention.
Figure 4:
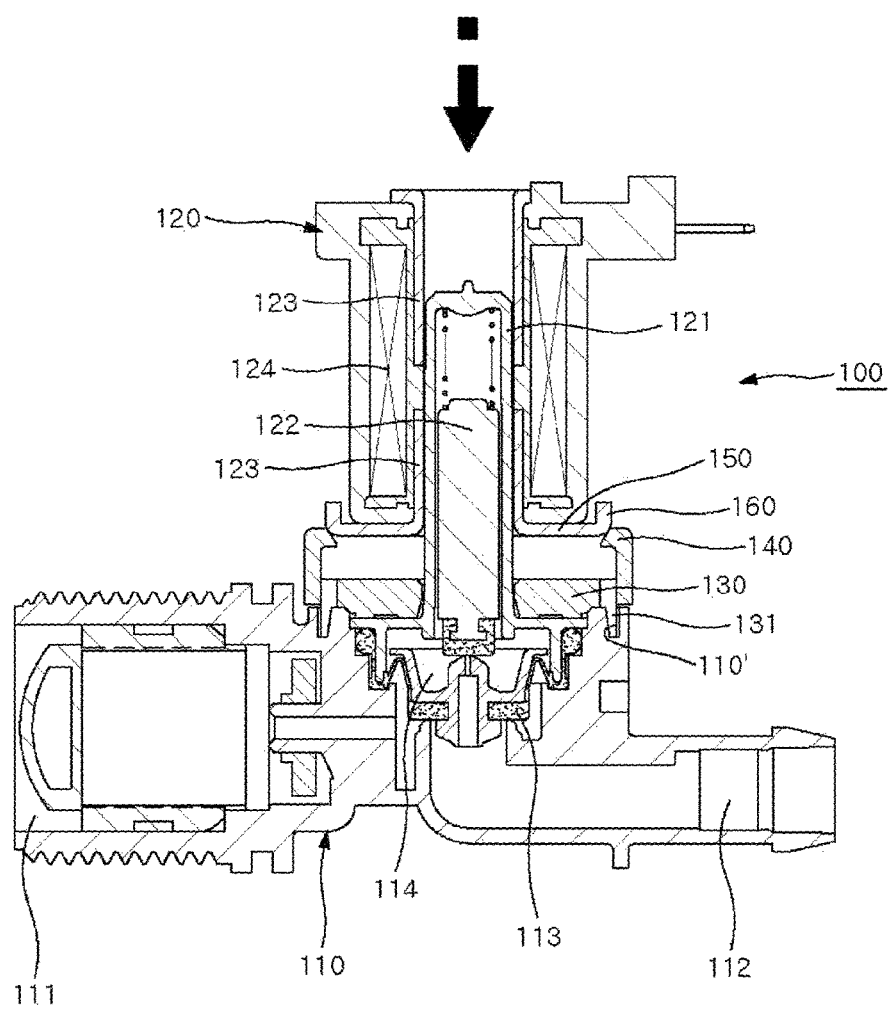
Figure 5:
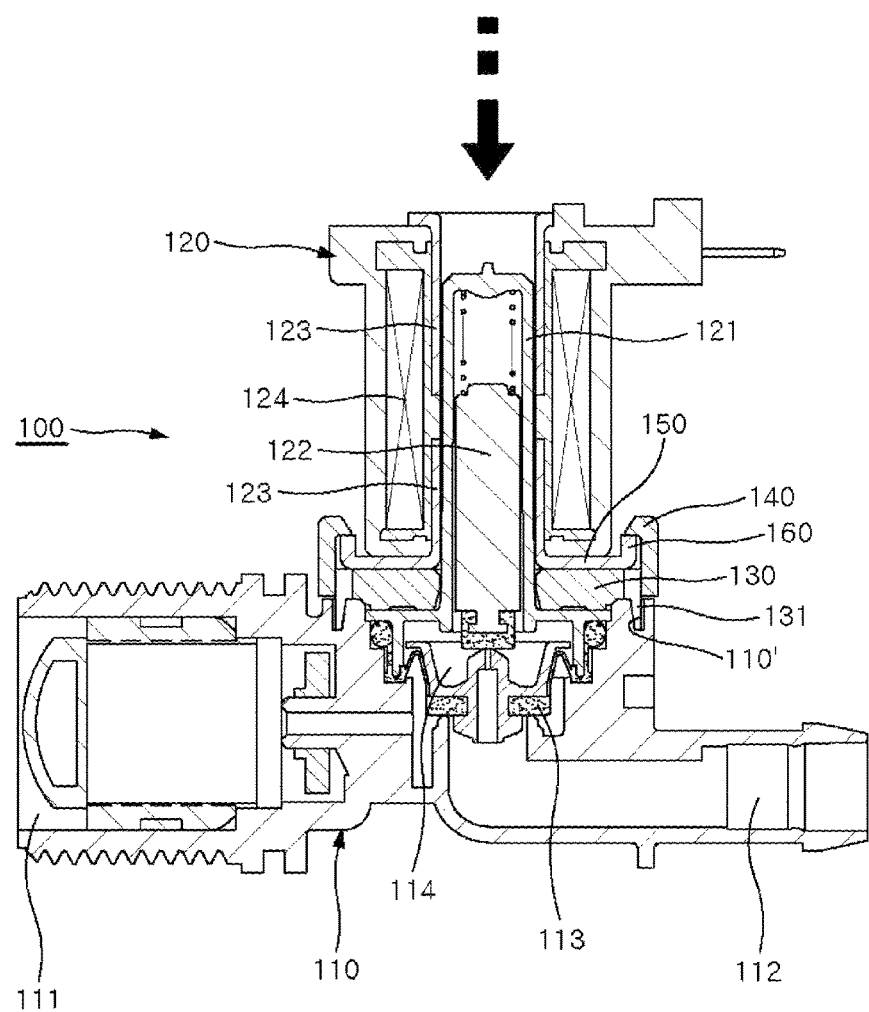

As shown in FIGS. 3 to 5, while the cap 121 holding a plunger 122 therein is mounted on the valve body 110 by covering an upper portion of the diaphragm 113 to protect the upper portion, the coupling member 130 is coupled to the valve body 110. The coupling protrusion 131 of the coupling member 130 is vertically located on a groove part 110' provided at an upper portion of the valve body 110, and is pressed downwardly so as to couple the coupling member to the valve body.

The at least one hook 140 protrudes from the upper portion of the coupling member 130 in a radial direction.

In addition, the electromagnetic part 120 wound with a coil 124 is coupled to the cap 121 of the valve body 110. The cap 121 is inserted into the sleeve 123 divided into upper and lower parts provided at upper and lower portions of the electromagnetic part 120 so as to couple the electromagnetic part to the cap.

As described above, when coupling the electromagnetic part 120 to the coupling member 130, the supporting plate 150 outwardly extending from a lower end of the sleeve 123 is located on an upper portion of the hook 140. At the same time, the locking piece 160 is located on the upper portion of the hook 140, thereby being in a coupling standby state.

When pressing the electromagnetic part 120 downwardly to the valve body 110 in the coupling standby state, the hook 140 extends outwardly by the pressure of the locking piece 160 to be coupled with the locking piece 160. The hook 140 is restored to an original position by elasticity of itself. Consequently, the electromagnetic part 120 is firmly coupled to the valve body 110.

Here, the engaging grooves 123' of the sleeve 123 of the electromagnetic part 120 are engaged with the engaging pieces 170 protruding from opposite sides of the supporting plate 150.

Therefore, the electromagnetic part 120 is engaged with the engaging pieces 170, thereby preventing the electromagnetic part from rotating on the valve body 110.

Terms or words used in the specification and claims are not limited to a meaning that is commonly understood by people or is defined in dictionaries, and should be interpreted as having a meaning that is consistent with meaning in the context of the relevant art.

Although the preferred embodiment of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A coupling structure of an electromagnetic valve for controlling water supply, the coupling structure comprising:
　　a coupling member provided with a coupling protrusion to be coupled to an upper portion of a valve body of the electromagnetic valve;
　　at least one hook provided on the coupling member to be hooked to a locking piece;
　　a supporting plate outwardly extending from a lower end of a sleeve to support the electromagnetic part of the electromagnetic valve, the sleeve being divided into upper and lower parts provided at upper and lower portions of the electromagnetic part;
　　the locking piece provided at an end of the supporting plate by being bent upwardly to be hooked to the hook, wherein the locking piece provided at the end of the supporting plate is bent in a direction away from the coupling member; and
　　engaging pieces protruding from opposite sides of the supporting plate to engage with engaging grooves of the sleeve, thereby preventing the electromagnetic part from rotating.

2. The coupling structure of claim 1, wherein the coupling member prevents a cap mounted on the valve body from being demounted therefrom.

3. The coupling structure of claim 1, wherein the hook is provided at an upper portion of the coupling member in a radial direction.

4. The coupling structure of claim 1, wherein the supporting plate includes a first surface facing and supporting the electromagnetic part of the electromagnetic valve and a second surface opposite the first surface and facing the coupling member provided with the coupling protrusion.

5. The coupling structure of claim 1, wherein the coupling protrusion extends in a direction away from the supporting plate.

6. The coupling structure of claim 1, wherein the hook protrudes in a radial direction towards a center of the coupling member.

7. The coupling structure of claim 1, wherein the engaging pieces protrude in a radial direction away from a center of the supporting plate.

8. The coupling structure of claim 1, comprising at least two hooks and at least two locking pieces, each of the locking pieces to be hooked to one of the hooks.

9. The coupling structure of claim 1, comprising more than two hooks and more than two locking pieces, each of the locking pieces to be hooked to one of the hooks.

10. An electromagnetic valve, comprising:
   a valve body provided with an inlet port and an outlet port through which water is respectively introduced and discharged, and a diaphragm between the inlet port and the outlet port to define a pressure chamber;
   an electromagnetic part fixed on the valve body to seal the pressure chamber, wherein the water is introduced into the pressure chamber or discharged to a target device in response to operation of the electromagnetic part, thereby controlling water supply; and
   a coupling structure comprising:
      a coupling member provided with a coupling protrusion to be coupled to an upper portion of the valve body;
      at least one hook provided on the coupling member to be hooked to a locking piece;
      a supporting plate outwardly extending from a lower end of a sleeve to support the electromagnetic part, the sleeve being divided into upper and lower parts provided at upper and lower portions of the electromagnetic part;
      the locking piece provided at an end of the supporting plate by being bent upwardly to be hooked to the hook, wherein the locking piece provided at the end of the supporting plate is bent in a direction away from the coupling member; and
      engaging pieces protruding from opposite sides of the supporting plate to engage with engaging grooves of the sleeve, thereby preventing the electromagnetic part from rotating.

11. The electromagnetic valve of claim 10, wherein the supporting plate includes a first surface facing and supporting the electromagnetic part of the electromagnetic valve and a second surface opposite the first surface and facing the coupling member provided with the coupling protrusion.

12. The electromagnetic valve of claim 10, wherein the coupling protrusion extends in a direction away from the supporting plate.

13. The electromagnetic valve of claim 10, wherein the hook protrudes in a radial direction towards a center of the coupling member.

14. The electromagnetic valve of claim 10, wherein the engaging pieces protrude in a radial direction away from a center of the supporting plate.

15. The electromagnetic valve of claim 10, comprising at least two hooks and at least two locking pieces, each of the locking pieces to be hooked to one of the hooks.

16. The electromagnetic valve of claim 10, comprising more than two hooks and more than two locking pieces, each of the locking pieces to be hooked to one of the hooks.

17. The electromagnetic valve of claim 10, wherein the valve body includes a groove part, the coupling protrusion of the coupling member to be coupled to the groove part.

18. An electromagnetic valve, comprising:
   a valve body provided with an inlet port and an outlet port through which water is respectively introduced and discharged, and a diaphragm between the inlet port and the outlet port to define a pressure chamber;
   an electromagnetic part fixed on the valve body to seal the pressure chamber, wherein the water is introduced into the pressure chamber or discharged to a target device in response to operation of the electromagnetic part, thereby controlling water supply; and
   a coupling structure comprising:
      a coupling member provided with a coupling protrusion to be coupled to an upper portion of the valve body;
      at least one hook provided on the coupling member to be hooked to a locking piece;
      a supporting plate outwardly extending from a lower end of a sleeve to support the electromagnetic part, the sleeve being divided into upper and lower parts provided at upper and lower portions of the electromagnetic part;
      the locking piece provided at an end of the supporting plate by being bent upwardly to be hooked to the hook; and
      engaging pieces protruding from opposite sides of the supporting plate to engage with engaging grooves of the sleeve, thereby preventing the electromagnetic part from rotating,
   wherein the valve body includes a groove part, the coupling protrusion of the coupling member to be coupled to the groove part.

* * * * *